United States Patent [19]

Bultman

[11] Patent Number: 5,782,309
[45] Date of Patent: Jul. 21, 1998

[54] APPARATUS AND METHOD FOR TILLING SOIL

[76] Inventor: Alan D. Bultman, 1411 S. Monroe, Hugoton, Kans. 67591

[21] Appl. No.: 187,591

[22] Filed: Jan. 25, 1994

[51] Int. Cl.[6] .................................................. A01B 35/18
[52] U.S. Cl. ................................... 172/540; 172/530
[58] Field of Search ............................. 172/540, 530, 172/518, 123

[56] References Cited

U.S. PATENT DOCUMENTS

| | | |
|---|---|---|
| 138,596 | 5/1873 | Tilton ............................. 172/123 |
| 2,098,738 | 11/1937 | Campbell . |
| 2,187,262 | 1/1940 | Brown . |
| 2,193,275 | 3/1940 | Elliott . |
| 2,196,038 | 4/1940 | Silver . |
| 2,221,550 | 11/1940 | Lindgren ........................ 172/530 |
| 2,225,258 | 12/1940 | Dahlman ........................ 172/540 |
| 2,233,331 | 2/1941 | Vratil . |
| 2,236,832 | 4/1941 | Nielsen . |
| 2,255,562 | 9/1941 | Harvey . |
| 2,269,974 | 1/1942 | Hipple ........................ 172/530 X |
| 2,325,997 | 8/1943 | Kelley et al. . |
| 2,780,975 | 2/1957 | Gunning . |
| 3,111,351 | 11/1963 | Tanke ............................ 172/518 |
| 4,213,502 | 7/1980 | Gibson . |
| 4,508,177 | 4/1985 | Wiser ........................ 172/540 X |
| 5,062,488 | 11/1991 | Lochmiller . |

*Primary Examiner*—Terry Lee Melius
*Assistant Examiner*—Christopher J. Novosad
*Attorney, Agent, or Firm*—John W. Carpenter

[57] ABSTRACT

An apparatus for tilling soil having a support assembly, a shaft assembly secured to the support assembly, and a paddle assembly secured to the shaft assembly. The paddle assembly has three interconnected blades such as to form a triangular opening wherethrough the shaft assembly passes and connects to the three interconnected blades. A method for tilling and/or pitting soil.

6 Claims, 6 Drawing Sheets

APPARATUS AND METHOD FOR TILLING SOIL

FIELD OF THE INVENTION

The present invention is related to an apparatus and method for tilling soil. The present invention more specifically provides an apparatus and method for forming or implanting of reservoirs along the ground surface for retaining irrigation and rain water against runoff between rows of crops.

BACKGROUND OF THE INVENTION

As set forth in U.S. Pat. No. 4,508,177 to Wiser, various devices have been developed and used for producing "dams" or "dikes" at spaced intervals between crop rows to catch and retain water. These units have appropriately been named "dammers" or "dikers". They typically make use of rotating scraper blades pulled behind a tractor. A "dammer" typically makes use of blades mounted to a rotatable shaft pulled behind the tractor. The blade will scrape along the ground surface until a hill of soil builds up along the front blade surface. Then a tipping mechanism operates to allow the blade to rotate on the shaft, leaving the soil "dam" behind and lowering a successive blade into engagement with the ground to form the next "dam". Various tripping mechanisms and blade configurations have been developed for this purpose. Examples of various "dammers" or "dikers" are illustrated by the following United States patents:

U.S. Pat. No. 2,225,258 to Dahlman,

U.S. Pat. No. 2,325,997 to Kelly et al,

U.S. Pat. No. 2,233,331 to Vratil,

U.S. Pat. No. 2,236,832 to Nielsen

U.S. Pat. No. 2,780,975 to Gunning,

U.S. Pat. No. 4,213,502 to Gibson,

U.S. Pat. No. 2,098,738 to Campbell,

U.S. Pat. No. 2,187,262 to Brown,

U.S. Pat. No. 2,193,275 to Elliot,

U.S. Pat. No. 2,196,038 to Silver,

U.S. Pat. No. 4,508,177 to Wiser,

U.S. Pat. No. 5,062,488 to Lochmiller

Some of the above patents deal with implements wherein soil "dams" are formed in furrows behind a furrow forming plowshare or cultivator. The top of the "dam" is typically at or near the original ground surface elevation with the furrow situated between the "dams".

As further set forth in U.S. Pat. No. 4,508,177 to Wiser, another form of water retention implement is commonly referred to as a "pitter" A "pitter" differs from a "dammer" or "diker" in function but not in principal. A pitter makes use of an extremely heavy frame carrying freely rotatable wheels with angular pitter blades spaced about their peripheries. The wheels roll freely over the ground when the tool is pulled ahead by a tractor. The shear weight of the frame and wheels drives the blades into the ground to form "pits" at spaced intervals. Overall weight of the tool or pitter is therefore necessarily high and requires a high horsepower tractor to pull the tool or pitter.

Thus, a common problem facing farmers who use dammers or pitters is the employment of an expensive high horsepower tractor in order to pull the dammer or pitter. Therefore, what is needed and what has been invented by me is an apparatus for tilling soil, more specifically an apparatus for pitting soil, that is capable of being pulled by a small tractor with reduced horsepower. Because the tractor of the present invention is smaller and less tractor power is required, the operation of the invention reduces time and expense of equipment since existing smaller tractors, say less than about 160 horsepower and having a front wheel drive, may be employed the ploy assembly of the present invention.

SUMMARY OF THE PRESENT INVENTION

The present invention accomplishes its desired objects by broadly providing an apparatus for tilling soil comprising a support assembly; a shaft assembly rotatably secured to the support assembly; and a paddle assembly secured to the shaft assembly. The paddle assembly comprises a first blade, a second blade and a third blade. The first blade is secured to the second blade and to the third blade. The second blade is secured to the first blade and to the third blade, and the third blade is secured to the first blade and to the second blade, such that the interconnected first, second, and third blades form a triangular opening wherethrough the shaft assembly passes and is lodged. The paddle assembly further comprises a first triangular support member having a first base side secured to the first blade and a first blade height side secured to the second blade, and a first hypotenuse edge extending from the second blade to the first blade to define a first ground entering edge. Similarly, a second triangular support member is provided having a second base side secured to the second blade and a second blade height side secured to the third blade, and a second hypotenuse edge extending from the third blade to the second blade to define a second ground entering edge. A third trianrgular support member is provided as having a third base side secured to the third blade and a third blade height side secured to the first blade and a third hypotenuse edge extending from the first blade to the third blade to define a third ground entering edge. The first blade has a structure defining a first planar member with a pair of first tapering edges. The second blade has a structure defining a second planar member with a pair of second tapering edges. The third blade has a structure defining a third planar member with a pair of third tapering edges. The support assembly comprises a first support assembly, a second support assembly secured to the first support assembly, and a third support assembly secured to the second support assembly and rotatably secured to the shaft assembly. The first support assembly comprises a first horizontal support member, a second horizontal support member, and a pair of end support members secured to the first horizontal support member and to the second horizontal support member. The second support assembly comprises a pair of upper angle iron members secured against the first horizontal support member and a pair of lower angle iron members secured against the first horizontal support member and interconnected with the upper angle iron members. The third support assembly comprises a pair of downwardly extending paddle support members secured to the pair of upper angle iron members and to the lower angle iron members. The shaft assembly comprises a hub housing having an external surface to which the first, the second, and the third blades are secured. The hub housing further has an internal bore with internal bore walls terminating in a first hub recess and in a second hub recess. A first outer race is secured to the hub housing within the first hub recess; and a second outer race is secured to the hub housing within the second hub recess. A first bearing member is in rotatable contact with the first outer race and a second bearing member is in rotatable contact with the second outer race. A first inner race is in contact with the first bearing member and a second inner race In contact with tee second bearing member; and an internal spacer is coaxially disposed in the internal bore and spaced from the internal bore walls and in contact with the first and the second inner race. A first external spacer is disposed in contact with the first inner race, and a second external spacer is disposed in contact with the second inner race; and a bolt member passes through the downwardly extending paddle support members and through the first and the second external spaces and through the first and the second inner race and through the inner spacer such that when a nut is threadably engaged to an end of the bolt member to compress the first external spacer, the first inner race, the inner spacer, the second inner race, and the second external spacer together and between the pair of downwardly extending paddle support members, the compressed first and second external spacers, first and second inner races and the inner spacer do not turn, allowing the first and second outer races and the hub housing to revolve on and around the first and second bearing members. The support assembly, the shaft assembly and the paddle assembly has a weight ranging from about 900 pounds to about 1300 pounds. A front wheel drive tractor having less than about 160 horsepower is provided to pull the apparatus for tilling soil. At least one ripper member is secured to the first support assembly. Preferably, the support assembly, the shaft assembly and the paddle assembly have a weight of over 1250 pounds say about 1300 pounds, and the front wheel drive tractor has a horsepower less than about 160, say about 140 horsepower.

The present invention further accomplishes its desired objects by broadly providing a method for tilling soil comprising the steps of:

(a) providing a tractor an a soil surface:

(b) coupling the tractor to the above defined apparatus for tilling soil;

(c) moving the apparatus for tilling soil with the tractor causing the paddle assembly to turn and sequentially implant holes in the soil surface supporting the apparatus for tilling.

It is therefore an object of the present invention to provide an apparatus for tilling and/or pitting soil.

It is another object of the present invention to provide a method for tilling and/or pitting soil.

These, together with the various ancillary objects and features which will become apparent to those skilled in the art as the following description proceeds, are attained by this invention, a preferred embodiment as shown with reference to the accompanying drawings, by way of example only, wherein:

DETAILED DESCRIPTION OF THE INVENTION

Figure 1:
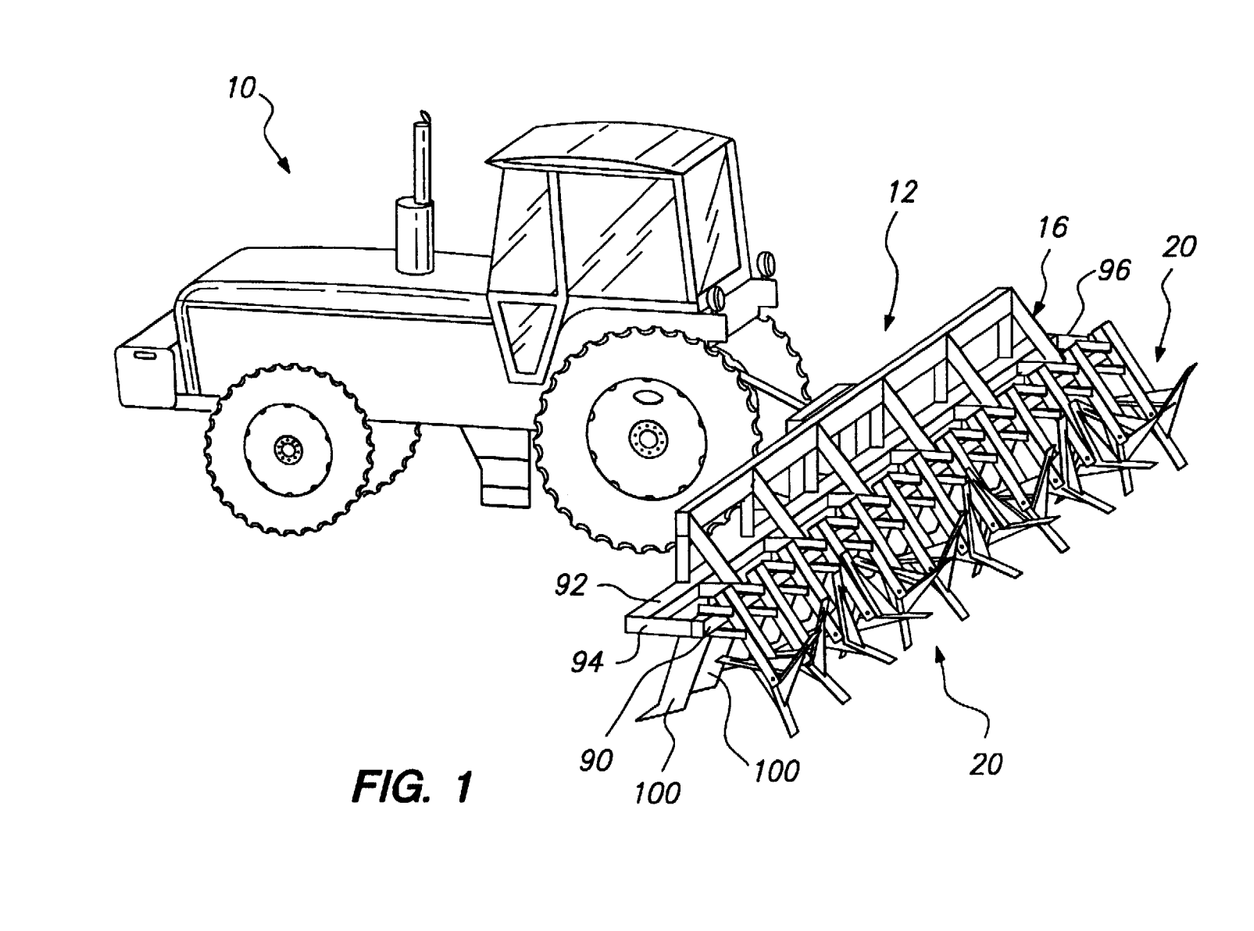
FIG. 1 is a perspective view of a four wheel, front drive, tractor having less then 100 horsepower and being coupled to an apparatus for tilling soil.

Referring in detail now to the drawings, wherein similar parts of the invention are identified by like reference numerals, there is seen a tractor, generally illustrated as 10, coupled to an apparatus for tilling soil, generally illustrated as 12. The tractor 10 employed in the present invention is preferably a reduced horsepower tractor, such as having a horsepower less than about 180 horsepower, say ranging from about 120 horsepower to about 160 horsepower, more preferably about 140 horsepower. The reduced horsepower tractor 10 is preferably a front wheel drive tractor. One of the salient points of the present invention is that because the apparatus 12 or plow assembly is relatively light and just or more as effective as conventional plow assemblies, the reduced horsepower tractor 10 may be used to pull the apparatus 12. Conventional tractors that pull heavy prior art plow assemblies have a horsepower over about 200 horsepower and are four (4) wheel drive tractors. Obviously large horsepower tractors may be employed to pull the apparatus 10 of the present invention, but such use is expensive and uneconomical. Thus, even though the apparatus 12 or plow assembly of the present invention is typically manufactured from iron, steel or the like, it is still light enough to be pulled by the reduced horsepower tractor 10. The apparatus 12 or plow assembly has a weight ranging from about 900 pounds to about 1500 pounds, and is just or more effective as the conventional expensive, heavy plow assemblies. More preferably the apparatus 12 or plow assembly has a weight ranging from about 900 pounds to about 1300 pounds, most preferably a weight over 1250 pounds such as about 1300 pounds. Thus, the apparatus 12 for tilling soil is relatively cheap and easy to manufacture, has a reduced weight, and has easily replaceable shafts and/or bearings upon which the paddle assemblies are supported and turn. One of the salient features of the present invention is that the apparatus 12 with a thirteen (13) row of paddle assemblies (identified as 20 below), may be pulled with a front wheel drive tractor 10, having less than about 160 horsepower say about 14 horsepower. The apparatus 12 of the present invention generally weights about 100 pounds per each paddle assembly (identified as 20 below). Conventional apparatuses with thirteen (13) row of paddle assemblies are typically so heavy and/or bulky that a four-wheel drive tractor is needed to pull the conventional apparatus. The conventionally prior art four-wheel drive tractors would have over 180 horsepower of power. Thus, a thirteen (13) row of paddle assemblies such as in FIG. 1 would weigh over about 1250 pounds for example about 1300 pounds.

The apparatus 12 for tilling soil comprises a support assembly, generally illustrated as 16, a shaft assembly, generally illustrated as 18 and secured to the support assembly 16; and a paddle assembly generally illustrated as 20 and secured to the shaft assembly 18. The paddle assembly 20 comprises a blade 24, a blade 26 and another blade 28. The blade 24 is secured to the blade 24 and to the blade 28. Blade 26 is secured to blade 24 and to blade 28. Similarly, blade 28 is secured to blade 24 and to blade 26, such that the interconnected blades 24, 26 and 28 form a triangular opining 30 (see FIG. 3) wherethrough the shaft assembly 18 passes and is lodged. The paddle assembly 20 further comprises a triangular support member 34 having a base side 36 secured to the blade 24 and a blade height side 38 secure to the blade 26, and a hypotenuse edge 40 extending from the blade 26 to the blade 24 to define a ground entering edge or point 40e. A triangular support member 42 is provided with a base side 44 secured to the blade 26 and a blade height side 46 secured to the blade 28, and with a hypotenuse edge 40 extending from the blade 28 to the blade 26 to define a ground entering edge 54. A triangular support member 60 is provided with a base side 62 secured to the blade 28 and a blade height side 64 secured to the blade 24 and with a hypotenuse edge 66 extending from the blade 24 to the blade 28 to define a ground entering edge or point 70. The blade 24 has a structure defining a planar member 24a with a pair of tapering edges 72—72. Blade 26 has a structure defining a planar member 26a with a pair of tapering edges 74—74. Likewise and similarly, the blade 28 has e structure defining a planar member 28a with a pa. of tapering edges 74—74 identical to tapering edges 74—74 and 72—72.

A plurality of tiller or ripper members 100 is secured to the support assembly 16 to till and/or rip the ground or soil before each of the paddle assemblies 20 enter the ground to form pits or reservoirs 80 where water is to collect for irrigation purposes. Immediately after each of the ripper members 100 has performed its respective functions, one of the paddles, say paddle 26 for illustrative purposes only, approaches the ripped and/or tilled soil. Depending on the height of the paddle assemblies 20 from the soil or ground and the desired depths of the pits 80, the hypotenuse edge 48 initially acts as a cutting or slicing edge into the ripped soil, as represented by the dotted lines in FIG. 2. Thus, for the height of the paddle assembly 20 in FIG. 2, the sequence of pitting the holes, pits or reservoirs 80 would be sequentially as follows: the hypotenuse edge 48 initially slides, cuts, or otherwise passes and slices into the tilled or ripped soil; the ground entering point 54 subsequently contacts the ripped soil and commences entering the ripped soil simultaneously or along with the tapering edges 74—74 of the blade 26 entrance into the ripped and sliced soil (sliced by the hypotenuse edge 48 for producing the pit 80 after the blade 26 has made its digging or pitting cycle and has left or exited the pit 80. The two remaining blades 24 and 28 would also follow the identical sequence (with their respective hypotenuse edges, ground entering points, and tapering edges) to produce two additional generally identical sized pits 80—80 such that a complete cycle of each paddle assembly 20 produces three generally identical sized pits 80—80—80. The complete cycle of each paddle assembly 20 may be repeated and repeated as many times as desired to produce sets of generally identical sized a pits 80—80—80.

Figure 2:
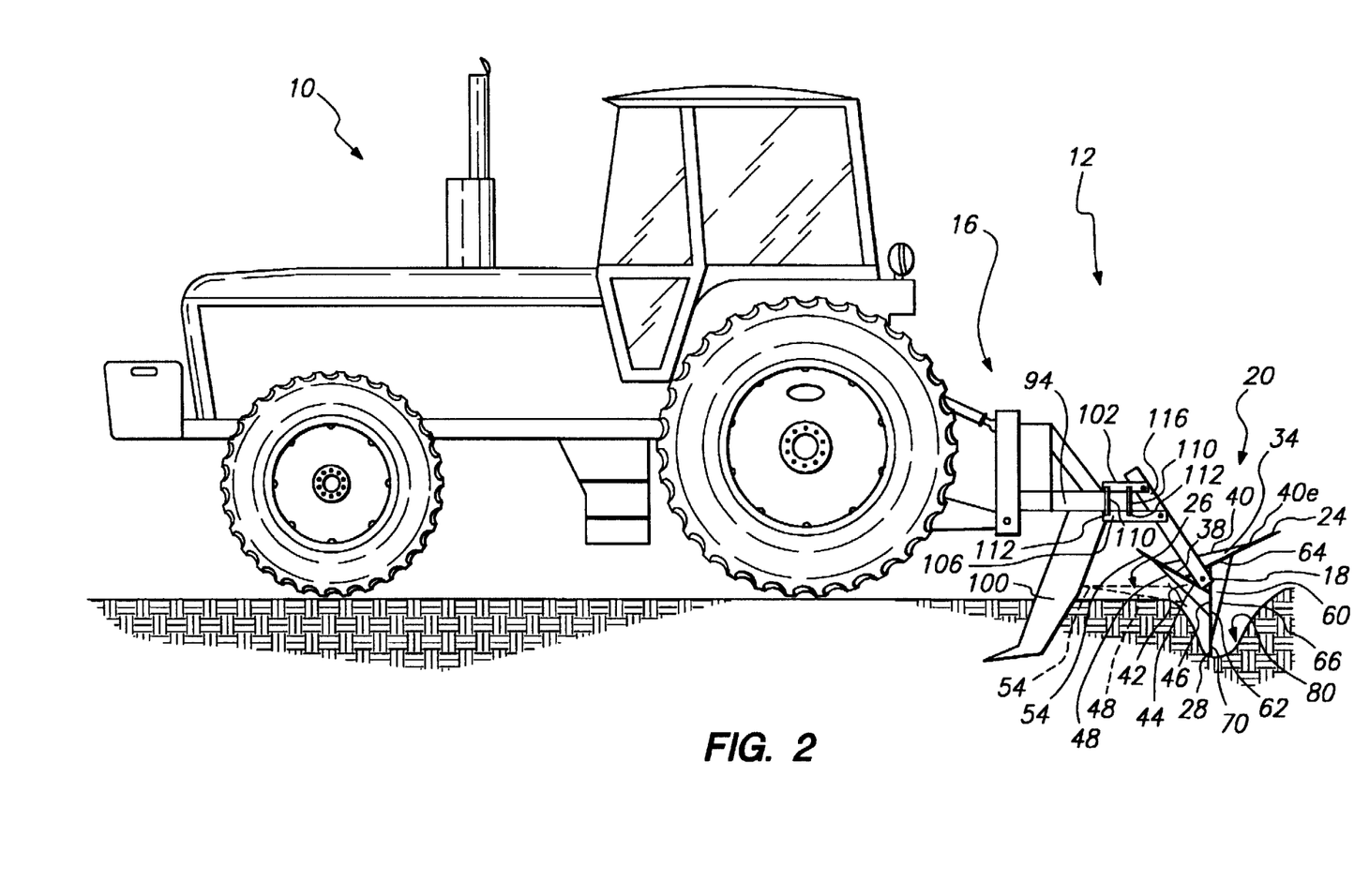
FIG. 2 is a side elevational view of the tractor and tilling of FIG. 1.
Figure 2A:
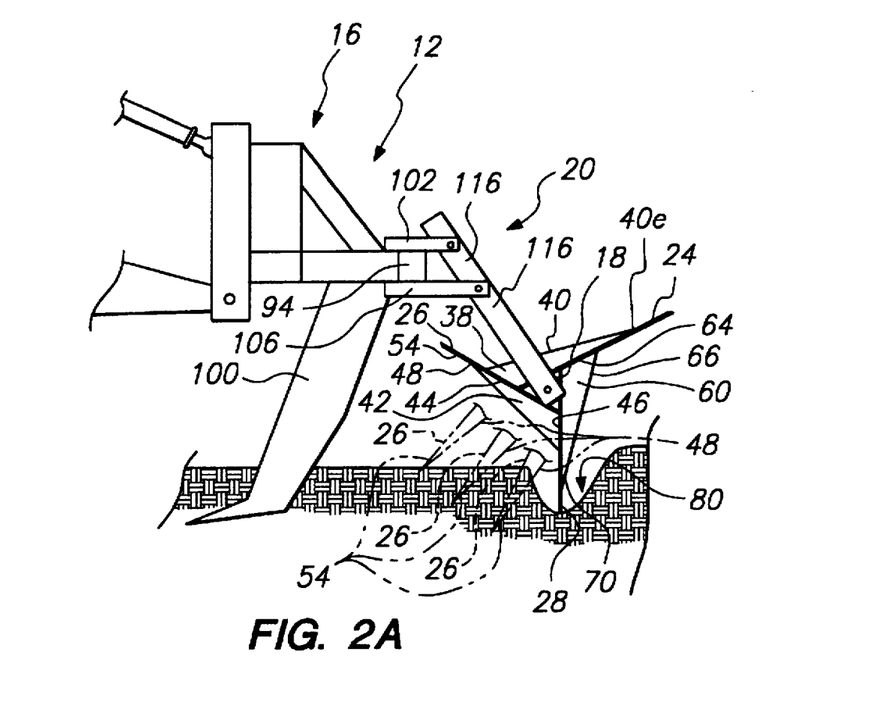
FIG. 2a is a partial side elevational view of the tilling

The plow assembly 20 in FIG. 2A has been set to produce a plurality or more shallow pits 80, and the hypotenuse edge 48 subsequently (not initially) acts as a cutting or slicing edge into the ripped soil, as represented by the dotted lines in FIG. 2A. Thus, for the height of the paddle assembly 20 in FIG. 2A and using paddle 26 for illustrative purposes only, the sequence for pitting holes, pits, or reservoirs 60 would be as follows: the tapering edges 74—74 of the blade 24 enter into the ripped soil; and the ground entering point 54 subsequently contacts and pierces the ripped soil such that the hypotenuse edge 48 subsequently commences its cutting or slicing of the ripped soil (as represented by the dotted lines in FIG. 2A) for producing the pit 80 after the paddle 26 has made its digging or pitting cycle and has left or exited the pit 80. Again, the two remaining blades 24 and 28 would also follow the identical sequence (with their respective tapering edges, ground entering points, and respective hypotenuse edges) to again produce two additionally generally identical sized pits 80—80 such that a complete cycle of each paddle assembly 20 produces three generally identical sized pits 80—80—80. As was seen for the paddle assembly 20 in FIG. 2, the complete cycle of each paddle assembly 20 may be repeated and repeated as many times as desired to provide sets of generally identical sized pits 80—80—80. Thus, the respective triangular supports pits 34, 42, and 60 provide not only a strengthening element or means for the interconnected blades 24, 26, and 28, but also provide for the slicing or cutting action into ripped or tilled soil. The base sides (i.e. base side 36, base side 44, and base side 62) extend over half of the length (preferably from 60% to 85%) of the length of the respective blades 24, 26 and 28, respectively.

Figure 3:
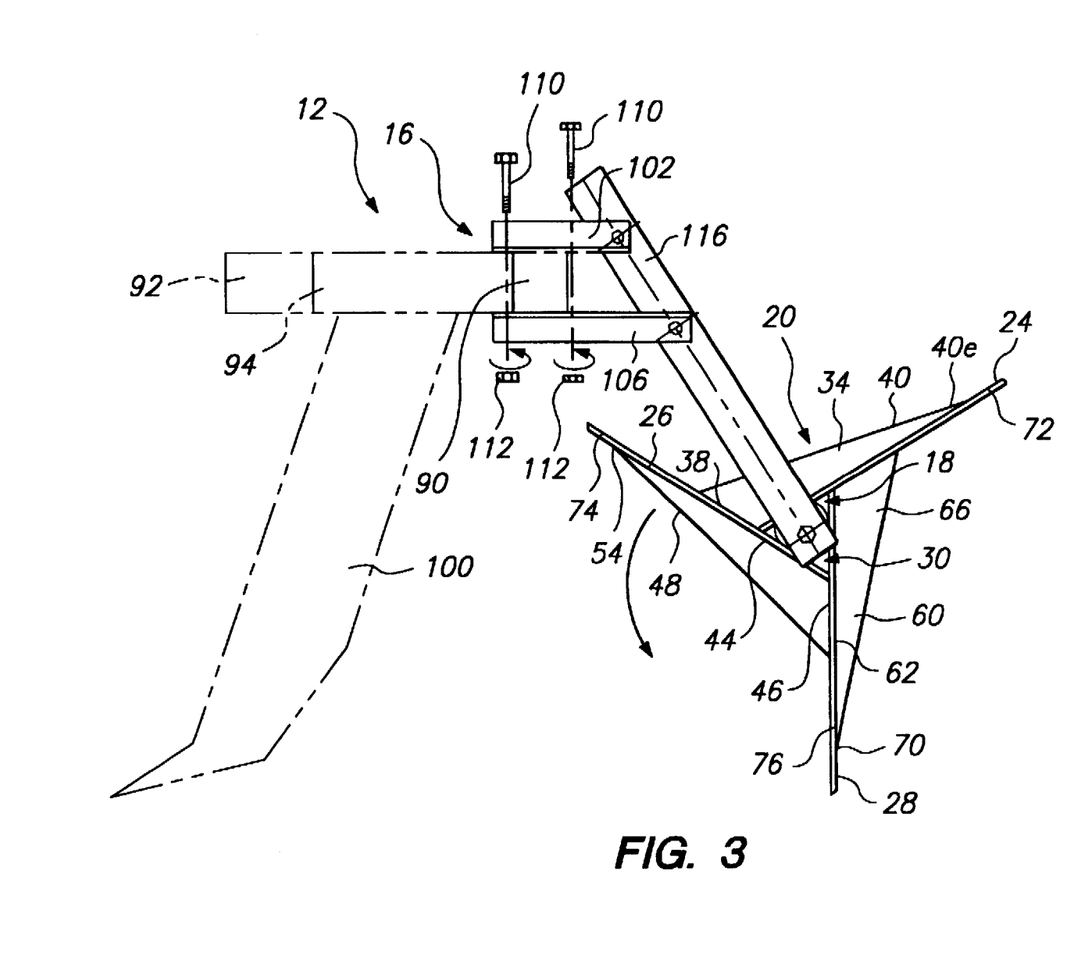
FIG. 3 is a side elevational view of the support frame and a paddle assembly

The support assembly 16 comprises a first support assembly, generally illustrated as 84, a second support assembly, generally illustrated as 86 and secured to the first support assembly 84; and a third support assembly, generally illustrated as 88 and secured to the second support assembly 86 and having the shaft assembly 18 rotatably secured thereto. The first support assembly 84 comprises a first horizontal support member 90, a second horizontal support member 92, and a pair of end support members 94 and 94 secured to the first horizontal support member 90 and to the second horizontal support member 92. The second support assembly 86 comprises a pair of upper angle iron members 102 and 104 secured against the first horizontal support member 90 and a pair of lower angle iron members 106 and 108 secured against the first horizontal support member 90 and interconnected with the upper angle iron members 102 and 104. As best shown in FIGS. 2 and 3, bolts 110 pass through the upper angle iron members 102 and 104 and the lower angle iron members 106 and 108 for threadably engaging nuts 112 to effect the interconnection. The third support assembly 88 comprises a pair of downwardly extending paddle support members 116—116 secured to the pair of upper angle iron members 102 and 104 and to the lower angle iron members 106 and 108.

Figure 4:
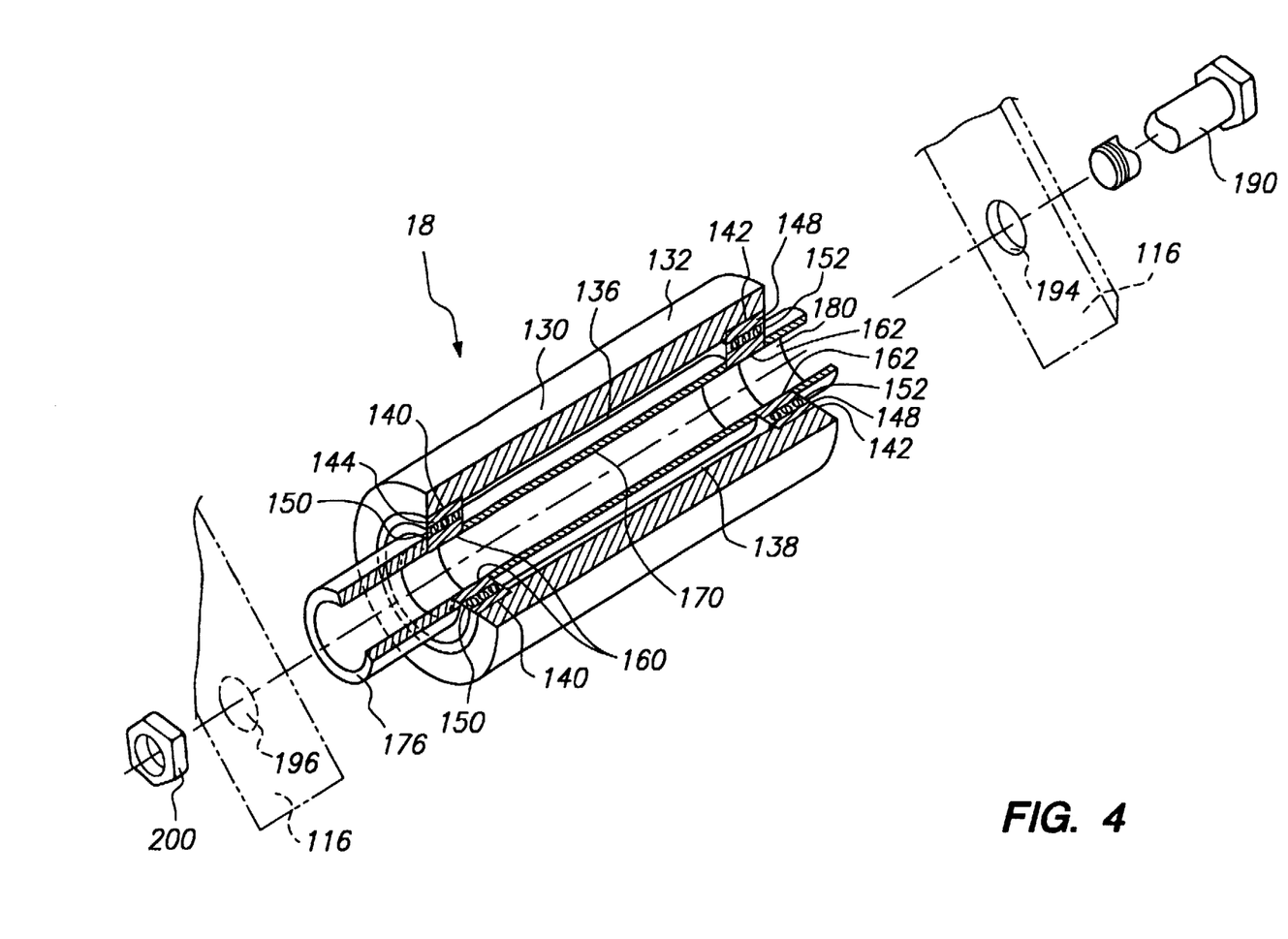
FIG. 4 is a partial perspective segmented, cut-away view of a bearing or shaft assembly that supports a paddle assembly.
Figure 5:
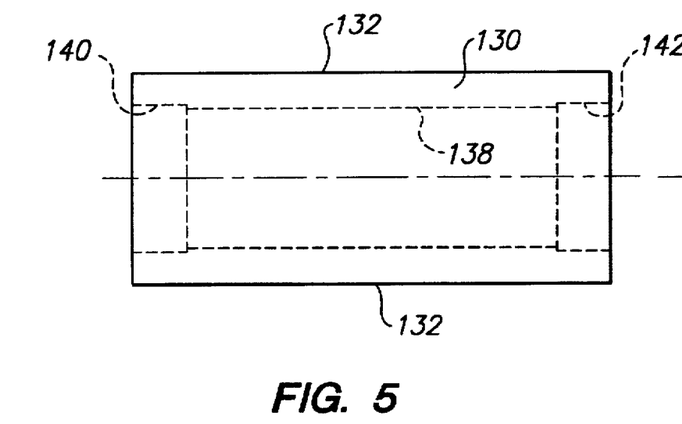
FIG. 5 is a side elevational view of a hub housing of the bearing or shaft assembly.
Figure 6:
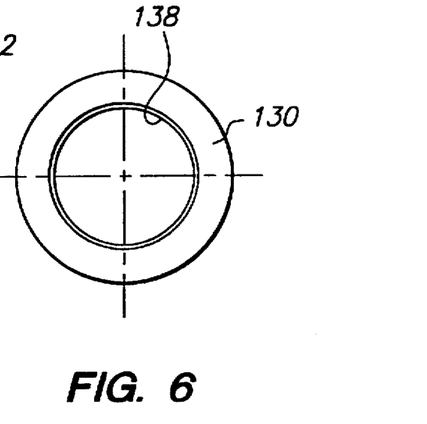
FIG. 6 is an end elevational view of the hub housing of Fig. 5.
Figure 7:
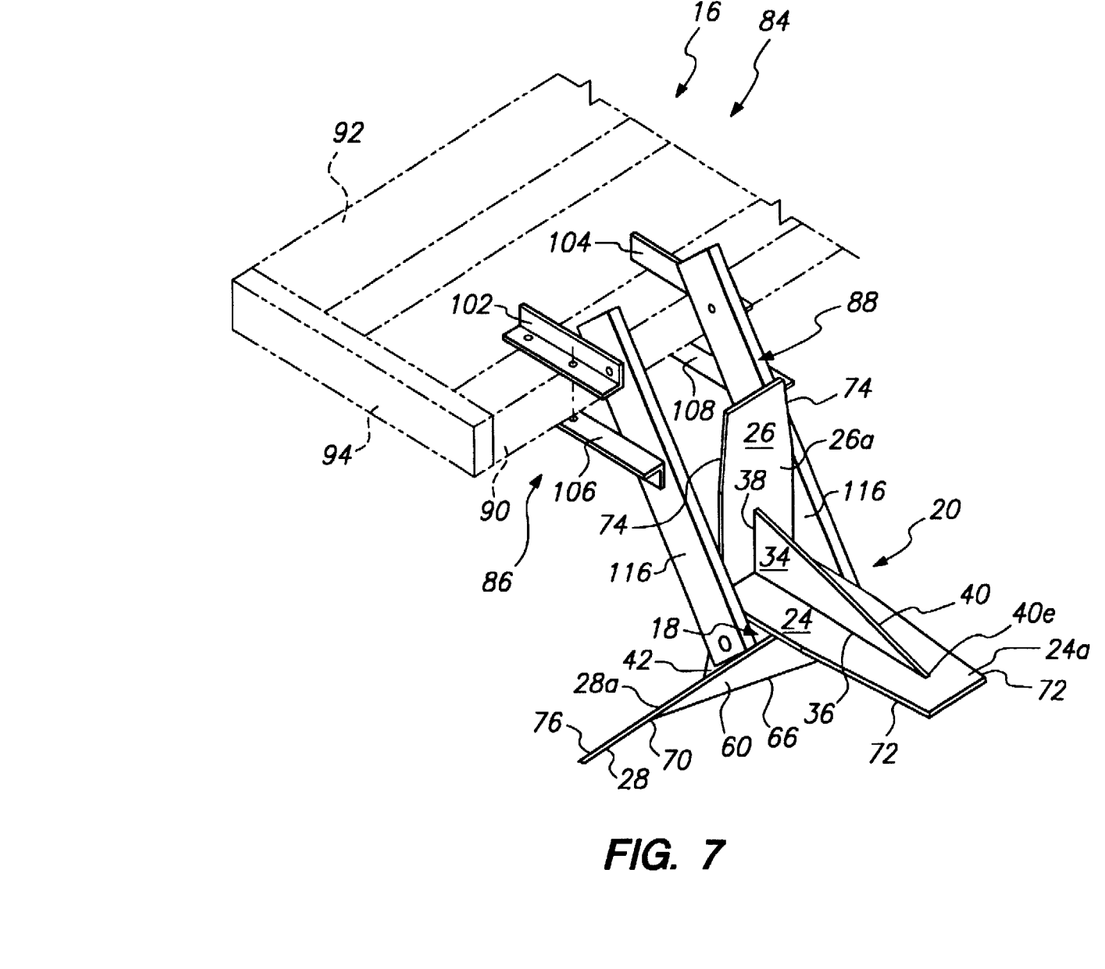
FIG. 7 is a perspective view of the paddle assembly.

The shaft assembly 18 comprises a hub housing 130 having an external surface 132 to which the blades 24, 26 and 28 are secured. The hub housing 130 further has an internal bore 136 with internal bore walls 138 terminating in a hub recess 140 and in a hub recess 142. An outer race 144 is secured to the hub housing 130 within the hub recess 140. An outer race 148 is secured to the hub housing 130 within the hub recess 142. The bearing member 150 is in rotatable contact with the outer race 144 and a bearing member 152 is in rotatable contact with the outer race 148. An inner race 160 is in contact with the bearing member 150 and an inner race 162 is in contact with the bearing member 152. An internal spacer 170 is coaxially disposed in the internal bore 136 and spaced from the internal bore walls 138 and in contact with inner races 160 and 162. An external spacer 176 is disposed in contact with the inner race 160, and another external spacer 180 is disposed in contact with the inner race 162. A bolt member 190 passes through apertures 194 and 196 in the downwardly extending paddle support members 116—116 and through the external spacers 176 and 180 and through the inner races 160 and 162 and through the inner spacer 170 and threadably engages nut 200 such that when nut 200 is threadably engaged and tightened on the bolt member 190 to compress the external spacer 174, the inner race 160, the inner spacer 170, the inner race 162, and the external spacer 150 together and between the pair of 4 downwardly extending paddle support members 116—116, the compressed external spacers 176 and 110, the inner races 160 and 162 and the inner spacer 170 do not turn, thus allowing the outer races 144 and 148 and the hub housing 130 to revolve on and around the bearing members 150 and 152.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. All apparatus for tilling soil comprising a support assembly; a shaft assembly rotatably secured to the support assembly; and a paddle assembly secured to the shaft assembly, said paddle assembly comprises a first blade, a second blade and a third blade; said first blade being secured to said second blade and to said third blade, said second blade being secured to said first blade and to said third blade, and said third blade being secured to said first blade and to said second blade, such that said interconnected said first, said second, and said third blade form a triangular opening wherethrough said shaft assembly passes and is lodged; and said paddle assembly further comprising, a first triangular support member having a first base side secured to the first blade and a first blade height side secured to the second blade, and a first hypotenuse edge extending from the second blade to the first blade to define a first ground entering edge, a second triangular support member living a second base side secured to the second blade and a second blade height side secured to the third blade, and a second hypotenuse edge extending from the third blade to the second blade to define a second ground entering edge, a third triangular support member having a third base side secure to the third blade and a third blade height side secure to the first blade and a third hypotenuse edge extending from the first blade to the third blade to define a third ground entering edge; and wherein said first blade has a structure defining a first planar member with a pair of first tapering edges, and wherein said second blade has a structure defining a second planar member with a pair of second tapering edge, and wherein said third blade has a structure defining a third planar member with a pair of third tapering edges; and said support assembly comprises a first support assembly, a second support assembly steadfastly secured to the first support assembly, and a third support assembly secured to the second assembly and having said shaft assembly rotatably secure thereto; said first support assembly comprising a first horizontal support member; a second horizontal support member, and a pair of end support members secured to the first horizontal support member and to the second horizontal support member; said second support assembly comprising a pair of upper angel iron members secured against the first horizontal support member and a pair of lower angel iron members secured against the first horizontal support member and interconnected with the upper angel iron members.

2. The apparatus of claim 1 wherein said third support assembly comprises a pair of downwardly extending paddle support members secured to said pair of upper angle iron members and to said lower angle iron members.

3. The apparatus of claim 2 wherein said shaft assembly comprises a hub housing having an external surface to which said first, said second, and said third blades are secured and said hub housing further having an internal bore with internal bore walls terminating in a first hub recess and in a second hub recess; a first outer race secured to said hub housing within said first hub recess; a second outter race secured to said hub housing within said second hub recess; a first bearing member in rotatable contact with said first outer race, a second bearing member in rotatable contact with said second outer race; a first inner race in contact with said first bearing member, a second inner race in contact with said second bearing member; an internal spacer coaxially disposed in said internal bore and spaced from the internal bore walls and in contact with said first and said second inner race; a first external spacer disposed in contact with said first inner race; and a second external spacer disposed in contact with said second inner race; and a bolt member passing through said downwardly extending paddle support members and through said first and said second external spacers and through said first and said second inner race and through said inner spacer such that when a nut is threadably engaged to an end of said bolt member to compress the first external spacer, the first inner race, the inner spacer, the second inner race, and the second external spacer together between the pair of downwardly extending paddle support members, to the compressed first and second external spacers, first and second inner races and the inner spacer do not turn, allowing the first and second outer races and the hub housing to revolve on and around the first and second bearing members.

4. The apparatus of claim 3 wherein said support assembly, said shaft assembly and said paddle assembly has a weight over 1250 pounds.

5. The apparatus of claim 4 additionally comprising a front wheel drive tractor having less than about 160 horsepower.

6. The apparatus of claim 5 additionally comprising at least one ripper member secured to said first support assembly.

* * * * *